US011924607B2

(12) United States Patent
Luan et al.

(10) Patent No.: US 11,924,607 B2
(45) Date of Patent: Mar. 5, 2024

(54) ELECTRONIC DEVICE AND ACOUSTIC WATERPROOF STRUCTURE

(71) Applicant: GOERTEK INC., Shandong (CN)

(72) Inventors: Qinglei Luan, Shandong (CN); Yang Yang, Shandong (CN)

(73) Assignee: GOERTEK INC., Shandong (CN)

( * ) Notice: Subject to any disclaimer, the term of this patent is extended or adjusted under 35 U.S.C. 154(b) by 316 days.

(21) Appl. No.: 17/435,806

(22) PCT Filed: Dec. 25, 2019

(86) PCT No.: PCT/CN2019/128184

§ 371 (c)(1),
(2) Date: Sep. 2, 2021

(87) PCT Pub. No.: WO2021/128040

PCT Pub. Date: Jul. 1, 2021

(65) Prior Publication Data

US 2022/0053266 A1 Feb. 17, 2022

(51) Int. Cl.
*H04R 1/44* (2006.01)
*H04R 1/02* (2006.01)

(52) U.S. Cl.
CPC ................. *H04R 1/44* (2013.01); *H04R 1/02* (2013.01)

(58) Field of Classification Search
CPC .................................... H04R 1/44; H04R 1/02
See application file for complete search history.

(56) References Cited

U.S. PATENT DOCUMENTS 6,188,773 B1 * 2/2001 Murata .................... H04R 1/44 381/361
10,050,374 B1 * 8/2018 Lee ....................... G06F 1/1656
10,296,057 B2 * 5/2019 Suezawa ............... H04M 1/035
2011/0255728 A1 * 10/2011 Abe ........................ H04M 1/03 381/355

(Continued)

FOREIGN PATENT DOCUMENTS

CN 104080304 10/2014
CN 208241822 12/2018

(Continued)

OTHER PUBLICATIONS

International Search Report issued in PCT/CN2019/128184 dated Sep. 25, 2020.

*Primary Examiner* — Oyesola C Ojo
(74) *Attorney, Agent, or Firm* — HAUPTMAN HAM, LLP

(57) ABSTRACT

An acoustic waterproof structure is provided according to the present application, which includes a casing, a waterproof breathable film, a stretchable material piece and a rigid supporting piece. A casing sound hole is provided on the casing, one side of the waterproof breathable film is sealed and connected to the casing and covers the casing sound hole, and the other side of the waterproof breathable film abuts against the stretchable material piece. A stretchable material piece sound hole is provided on the stretchable material piece; at least one through hole is provided on the rigid supporting piece, one side of the rigid supporting piece is sealed and connected to the casing and extrudes the stretchable material piece, and the other side of the rigid supporting piece is configured to connect to an acoustic device.

14 Claims, 3 Drawing Sheets

(56) References Cited

U.S. PATENT DOCUMENTS

| | | | | |
|---|---|---|---|---|
| 2013/0063004 | A1* | 3/2013 | Lai | G06F 1/1688 312/223.1 |
| 2013/0223656 | A1* | 8/2013 | Iuchi | H04R 1/086 381/189 |
| 2014/0294217 | A1* | 10/2014 | Yamaguchi | H04M 1/035 381/334 |
| 2015/0256657 | A1* | 9/2015 | Choe | H04M 1/026 455/550.1 |
| 2017/0157573 | A1* | 6/2017 | Mori | B01D 71/36 |
| 2019/0255801 | A1* | 8/2019 | Seo | B32B 27/40 |

FOREIGN PATENT DOCUMENTS

| | | | | |
|---|---|---|---|---|
| CN | 209390254 | | 9/2019 | |
| KR | 102062251 | B1 * | 3/2020 | H04R 1/02 |
| WO | WO2016009583 | | 1/2016 | |
| WO | WO2018008910 | | 1/2018 | |

* cited by examiner

ELECTRONIC DEVICE AND ACOUSTIC WATERPROOF STRUCTURE

The present application is a 371 application of International Patent Application No. PCT/CN2019/128184, filed Dec. 25, 2019, titled "ELECTRONIC DEVICE AND ACOUSTIC WATERPROOF STRUCTURE", which is incorporated herein by reference in its entirety.

FIELD

The present application relates to the technical field of waterproof structures, and in particular to an acoustic waterproof structure, and an electronic device including the same.

BACKGROUND

Acoustic devices and microphones are applied in a variety of electronic devices. For example, wearable devices such as bracelets and watches may be equipped with acoustic devices and microphones.

Take wearable devices as an example. As function thereof become more and more perfect, the wearable device is required to have desirable acoustic performance and meet high-level waterproof requirement at the same time. The desirable acoustic performance and waterproof performance need to be satisfied by a sealing structure. At present, the conventional sealing structure is mostly sealed by dispensing glue such as hot melt glue, silica gel, etc. However, fixed cost of dispensing glue is relatively high, which is not repairable and has a relatively high maintenance cost.

In summary, a technical issue to be addressed by those skilled in the art is to effectively solve the problem of high maintenance cost of a sealing structure adopting dispensing glue.

SUMMARY

In view of this, a first object of the present application is to provide an acoustic waterproof structure, a structural design of the acoustic waterproof structure may effectively solve the problem of high maintenance cost of a sealing structure adopting dispensing glue; a second object of the present application is to provide an electronic device including the above acoustic waterproof structure.

In order to achieve the first object, the following technical solutions are provided according to the present application.

An acoustic waterproof structure, including a casing, a waterproof breathable film, a stretchable material piece and a rigid supporting piece; a casing sound hole is provided on the casing; one side of the waterproof breathable film is sealed and connected to the casing and covers the casing sound hole, and the other side of the waterproof breathable film abuts against the stretchable material piece; a stretchable material piece sound hole is provided on the stretchable material piece; at least one through hole is provided on the rigid supporting piece, one side of the rigid supporting piece is sealed and connected to the casing and extrudes the stretchable material piece, and the other side of the rigid supporting piece is connected to an acoustic device.

Preferably, in the above acoustic waterproof structure, a mounting groove is provided on the casing, and the casing sound hole is provided at a bottom of the mounting groove; the waterproof breathable film and the stretchable material piece are all arranged inside the mounting groove, and the waterproof breathable film is sealed and connected to the bottom of the mounting groove.

Preferably, in the above acoustic waterproof structure, the stretchable material piece is made of closed-cell foam.

Preferably, in the above acoustic waterproof structure, the waterproof breathable film is connected to the casing through a waterproof double-sided adhesive tape.

Preferably, in the above acoustic waterproof structure, the rigid supporting piece is connected to the casing through a waterproof double-sided adhesive tape.

Preferably, in the above acoustic waterproof structure, two opposite ends of the rigid supporting piece are fixedly connected to the casing by dispensing glue.

Preferably, in the above acoustic waterproof structure, the rigid supporting piece includes a supporting main body and two wing portions respectively connected to two opposite ends of the supporting main body; the two wing portions are fixedly connected to the casing, and multiple through holes are provided on the supporting main body.

Preferably, the above acoustic waterproof structure further includes a bracket, one side of the bracket is sealed and connected to the rigid supporting piece, a cavity for sealing and mounting the acoustic device is provided at the other side of the bracket; a bracket sound hole for communicating with the cavity is provided on the bracket.

Preferably, in the above acoustic waterproof structure, the bracket includes a rigid main body and a silicone piece fixedly connected to the rigid main body; the silicone piece includes a sealing ring protruding from one side of the rigid main body and a sealing portion located on the other side of the rigid main body; the sealing portion forms the cavity, and the sealing ring is sealed with the rigid supporting piece.

The acoustic waterproof structure provided according to the present application includes a casing, a waterproof breathable film, a stretchable material piece and a rigid supporting piece, where a casing sound hole is provided on the casing; one side of the waterproof breathable film is sealed and connected to the casing and covers the casing sound hole, and the other side of the waterproof breathable film abuts against the stretchable material piece; at least one through hole is provided on the rigid supporting piece, one side of the rigid supporting piece is sealed and connected to the casing and extrudes the stretchable material piece, and the other side of the rigid supporting piece is configured to connect to an acoustic device, so that audio from the acoustic device is capable of transmitting through the through hole of the rigid supporting piece, the stretchable material piece sound hole of the stretchable material piece, the waterproof breathable film and the casing sound hole.

In case that the acoustic waterproof structure provided by the present application is applied, the waterproof breathable film may allow audio to pass through, but may prevent the passage of liquid, so the waterproof breathable film may be provided on the casing to play a waterproof role. The stretchable material piece abuts against the waterproof breathable film to provide support for the waterproof breathable film. The rigid supporting piece extrudes the stretchable material piece to provide support for the waterproof breathable film and the stretchable material piece. In addition, the stretchable material piece is extruded to continuously provide the waterproof breathable film with a reaction force against the liquid entry force to meet high level waterproof requirement. Meanwhile, with the arrangement of the stretchable material piece, in case that other parts are mounted on the side of the rigid supporting piece, away from the stretchable material piece, even if the rigid supporting piece is displaced due to a force, a force acted by the rigid supporting piece on the stretchable material piece is absorbed by the stretchable material piece and is not transferred to the waterproof breathable film, which prevents the waterproof breathable film from being deformed and wrinkled, thereby ensuring the sealing effect and avoiding adverse effects on the acoustic performance. And in case that the waterproof breathable film is damaged, it is only necessary to replace a new waterproof breathable film, so the maintenance cost is relatively low.

In order to achieve the second object, an electronic device is further provided according to the present application, which includes any of the above acoustic waterproof structures. Since the above acoustic waterproof structure has the above technical effects, the electronic device including the acoustic waterproof structure should also have corresponding technical effects.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be obtained based on the provided drawings without any creative efforts.

Figure 1:
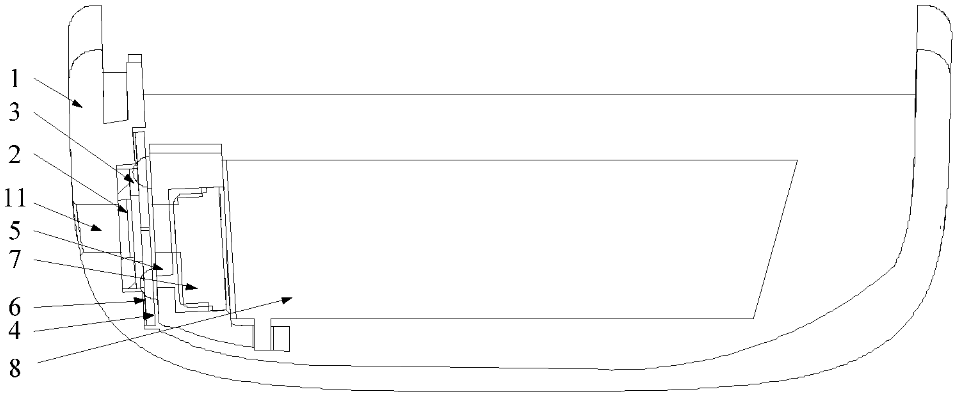
FIG. 1 is a schematic cross-section view of an acoustic waterproof structure provided according to an embodiment of the present application.
Figure 2:
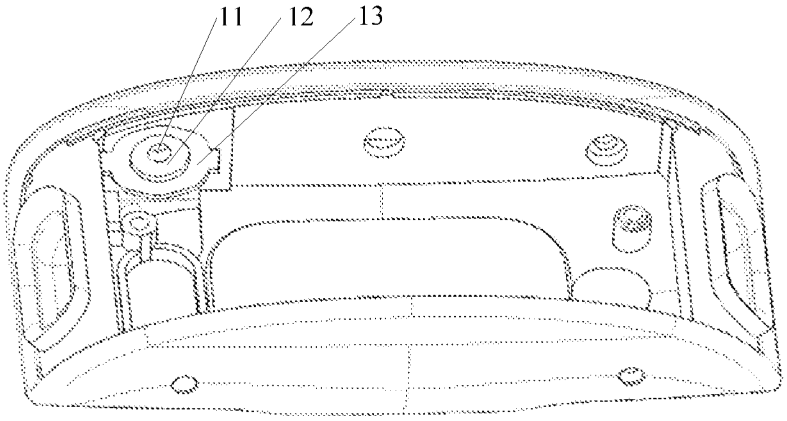
FIG. 2 is a partial structural view of a casing in FIG. 1.
Figure 3:
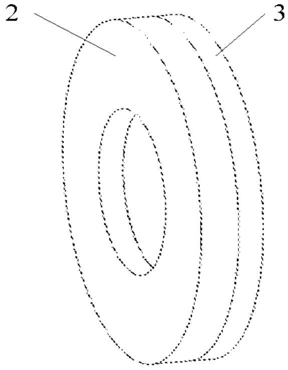
FIG. 3 is a schematic diagram of a combination structure of a waterproof breathable film and a stretchable material piece in FIG. 1.
Figure 4:
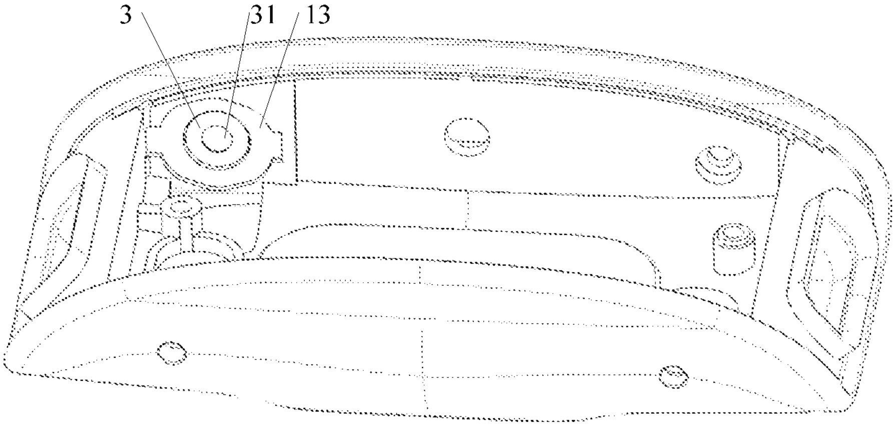
FIG. 4 is a schematic diagram of a waterproof breathable film and a stretchable material piece being assembled on a casing.
Figure 5:
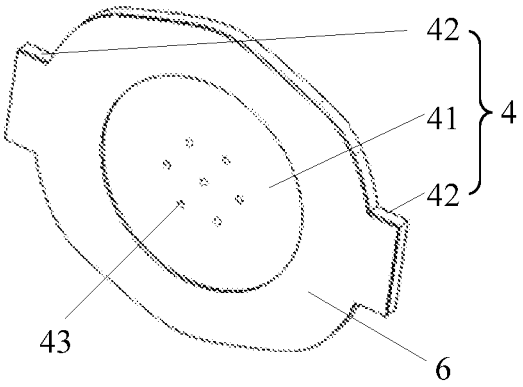
FIG. 5 is a schematic structural view of a rigid supporting piece in FIG. 1.
Figure 6:
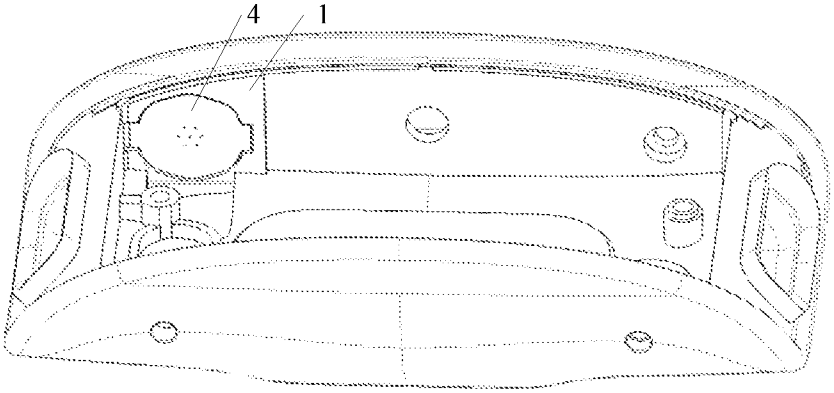
FIG. 6 is a schematic diagram of the rigid supporting piece being assembled on the casing.
Figure 7:
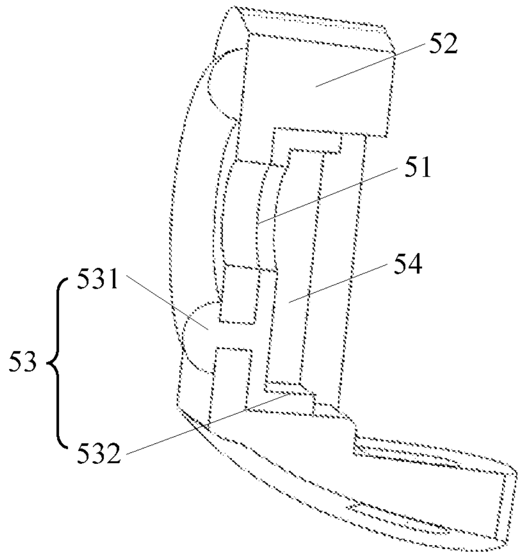
FIG. 7 is a schematic structural view of a bracket in FIG. 1.
Figure 8:
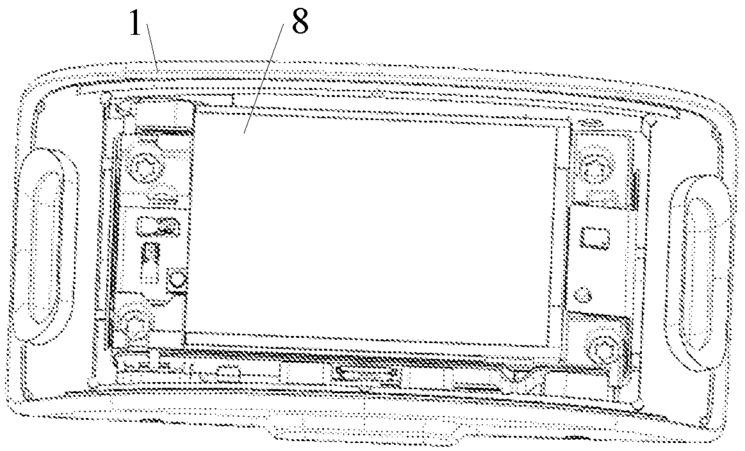
FIG. 8 is a schematic structural view of a battery assembly being assembled inside a casing.

REFERENCE NUMERALS IN THE FIGURES casing 1, waterproof breathable film 2, stretchable material piece 3, rigid supporting piece 4, bracket 5, waterproof double-sided adhesive tape 6, acoustic device 7, battery assembly 8, casing sound hole 11, mounting groove 12, groove 13, stretchable material piece sound hole 31, supporting main body 41, wing portion 42, through hole 43, bracket sound hole 51, rigid main body 52, silicone piece 53, sealing ring 531, sealing portion 532, and cavity 54.

DETAILED DESCRIPTION OF THE EMBODIMENTS

The technical solutions according to the embodiments of the present application will be described as follows in conjunction with the drawings in the embodiments of the present application. It is apparent that the described embodiments are only a part of the embodiments according to the present application, rather than all of the embodiments. Based on the embodiments of the present application, all other embodiments obtained without creative efforts by those of ordinary skill in the art shall fall within the protection scope of the present application.

An electronic device and an acoustic waterproof structure are provided according to embodiments of the present application, so as to meet high level waterproof requirement and reduce subsequent maintenance cost.

Reference is made to FIGS. 1 to 8. FIG. 1 is a schematic cross-section view of an acoustic waterproof structure provided according to a specific embodiment of the present application, and FIG. 2 to FIG. 8 are schematic diagrams of various components and assembly relationships in FIG. 1.

In a specific embodiment, an acoustic waterproof structure provided by the present application includes a casing 1, a waterproof breathable film 2, a stretchable material piece 3 and a rigid supporting piece 4.

The casing 1 is a main body supporting and protecting structure. In case that the acoustic waterproof structure is adopted in an electronic device such as wearable device, the casing 1 may be a casing 1 of the electronic device. If necessary, the casing 1 may also be a casing 1 separately provided for the acoustic waterproof structure. The casing 1 has a casing sound hole 11 for audio transmission. Specific shape of the casing 1 may be set as required, which is not specifically limited herein.

One side of the waterproof breathable film 2 is sealed and connected to the casing 1 and covers the casing sound hole 11, and the other side of the waterproof breathable film 2 abuts against the stretchable material piece 3. The waterproof breathable film 2 is a film that allows audio to pass through but prevents liquid from passing through. It should be noted that the waterproof in the waterproof breathable film 2 generally refers to preventing the passage of liquid, and is not limited to water. By sealing and connecting the waterproof breathable film 2 to the casing 1 and covering the casing sound hole 11, waterproofing is achieved. Since the waterproof breathable film 2 is generally a flexible film, the stretchable material piece 3 is provided to support the water proof breathable film 2. The stretchable material piece 3 and the waterproof breathable film 2 abut against each other. Specifically, the stretchable material piece 3 and the waterproof breathable film 2 may be fixedly connected as a whole to form a waterproof film component. The stretchable material piece sound hole 31 is provided on the stretchable material piece 3 to allow audio transmission. Of course, the stretchable material piece sound hole 31 should be at least partially opposite to the casing sound hole 11 of the casing 1. The stretchable material piece 3 may specifically be foam.

At least one through hole 43 is provided on the rigid supporting piece 4, one side of the rigid supporting piece 4 is sealed and connected to the casing 1 and extrudes the stretchable material piece 3, and the other side of the rigid supporting piece 4 is configured to connect to an acoustic device 7, so that audio from the acoustic device 7 is capable of transmitting through the through hole 43 of the rigid supporting piece 4, the stretchable material piece sound hole 31 of the stretchable material piece 3, the waterproof breathable film 2 and the casing sound hole 11. Specifically, the acoustic device 7 may be a speaker or a microphone. The rigid supporting piece 4 mainly supports the waterproof breathable film 2 and the stretchable material piece 3, and it may specifically be a metal sheet, such as a steel sheet. The rigid supporting piece 4 is sealed and connected to the casing 1. One side of the stretchable material piece 3 abuts against the waterproof breathable film 2, and the other side is extruded by the rigid supporting piece 4, so that the rigid supporting piece 4 acts a force on the waterproof breathable film 2 through the stretchable material piece 3. Specifically, by setting a thickness of the stretchable material piece 3, extrusion amount of the rigid supporting piece 4 extruding the stretchable material piece 3 is adjusted, and force on the waterproof breathable film 2 is controlled to meet the corresponding waterproof grade requirement. At least one through hole 43 is provided on the rigid supporting piece 4 to allow audio to pass through. Of course, the through hole 43 should be at least partially opposite to the stretchable material piece sound hole 31 of the stretchable material piece 3. In order to provide better support while ensuring audio transmission, multiple through holes 43 may be provided on the rigid supporting piece 4, and the through holes 43 may be micro-holes with diameter less than 1 mm.

In case that the acoustic waterproof structure provided by the present application is applied, the waterproof breathable film 2 may allow audio to pass through, but may prevent the passage of liquid, so the waterproof breathable film 2 may be provided on the casing 1 to play a waterproof role. The stretchable material piece 3 abuts against the waterproof breathable film 2 to provide support for the waterproof breathable film 2. The rigid supporting piece 4 extrudes the stretchable material piece 3 to provide support for the waterproof breathable film 2 and the stretchable material piece 3. In addition, the stretchable material piece 3 is extruded to continuously provide the waterproof breathable film 2 with a reaction force against the liquid entry force to meet high level waterproof requirement, such as 5 ATM waterproof requirement.

Moreover, with the arrangement of the stretchable material piece 3, in case that other parts are mounted on one side of the rigid supporting piece 4, away from the stretchable material piece 3, even if the rigid supporting piece 4 is displaced due to a force, a force acted by the rigid supporting piece 4 on the stretchable material piece 3 is absorbed by the stretchable material piece 3 and may not be transferred to the waterproof breathable film 2, which prevents the waterproof breathable film 2 from being deformed and wrinkled, thereby ensuring the sealing effect and avoiding adverse effects on the acoustic performance. And in case that the waterproof breathable film 2 is damaged, it is only necessary to replace a new waterproof breathable film 2, so the maintenance cost is relatively low.

Specifically, a mounting groove 12 is provided on the casing 1, and the casing sound hole 11 is provided at the bottom of the mounting groove 12. The waterproof breathable film 2 and the stretchable material piece 3 are both arranged in the mounting groove 12. The waterproof breathable film 2 is sealed and connected to the bottom of the mounting groove 12. With the arrangement of the mounting groove 12, installation of the waterproof breathable film 2 and the stretchable material piece 3 are convenient. The mounting groove 12 may limit the circumferential direction of the stretchable material piece 3, so that the rigid supporting piece 4 may act a pressing force on the stretchable material piece 3 from one side thereof. Preferably, a depth of the mounting groove 12 should be less than a total thickness of the waterproof breathable film 2 and the stretchable material piece 3, so that the rigid supporting piece 4 may better extrude the stretchable material piece 3 in case of sealed connecting to the casing 1. Specifically, the shape of the mounting groove 12 is the same as the shape of the waterproof breathable film 2. In case that the waterproof breathable film 2 is a circular film, the mounting groove 12 is a groove with a circular cross section. The casing sound hole 11 is provided at the groove bottom, and after one side of the waterproof breathable film 2 is sealed and connected to the groove bottom, the waterproof breathable film 2 is sealed at the casing sound hole 11 to play a waterproof role.

In the above embodiment, the stretchable material piece 3 is made of closed-cell foam. By adopting the closed-cell foam, a shearing force along an end surface direction of the waterproof breathable film 2 transmitted by the rigid supporting piece 4 is absorbed to prevent deformation and wrinkles of the waterproof breathable film 2. Moreover, acoustic sealing effect may be achieved in case that the closed-cell foam is extruded, so there is no need to separately mount acoustic sealing pieces. If necessary, the stretchable material piece 3 may also be made of sponge or other elastic materials capable of absorbing force from the rigid supporting piece 4.

In an embodiment, the waterproof breathable film 2 is connected to the casing 1 through a waterproof double-sided adhesive tape 6. That is, the waterproof breathable film 2 is provided with an adhesive layer on one side, and the waterproof breathable film 2 is sealed and connected to the casing 1 through the adhesive layer. In case that the mounting groove 12 is provided on the casing 1, the waterproof breathable film 2 is sealed and connected to the groove bottom of the mounting groove 12. Specifically, one side of the waterproof breathable film 2 is provided with an adhesive layer in circle. By adopting the waterproof double-sided adhesive tape 6 for connection, the waterproof breathable film 2 and the casing 1 may be fixedly connected to each other while achieving sealing, thereby ensuring the reliability of the waterproof structure. In order to improve adhesive force of the waterproof double-sided adhesive tape 6, during assembly, the waterproof double-sided adhesive tape 6 is activated by the tooling to maintain pressure, and the waterproof breathable film 2 is bonded to the casing 1 in a pressure-maintained state, thereby ensuring the reliability of the connection. If necessary, the waterproof breathable film 2 and the casing 1 are not limited to being bonded by the adhesive layer, and other conventional sealing connection methods in the prior art may also be adopted for connection. It should be noted that, during assembly, a waterproof film assembly is formed by the waterproof breathable film 2 and the stretchable material piece 3. One side of the waterproof film assembly, that is, one side where the waterproof breathable film 2 locates, is provided with the above adhesive layer, and the other side where the stretchable material piece 3 locates, is not provided with the adhesive layer, which directly contacts the rigid supporting piece 4 and is extruded by the rigid supporting piece 4.

In an embodiment, the rigid supporting piece 4 is connected to the casing 1 through the waterproof double-sided adhesive tape 6. That is, the rigid supporting piece 4 is provided with an adhesive layer on one side, and the rigid supporting piece 4 is sealed and connected to the casing 1 through the adhesive layer. Specifically, one side of the rigid supporting piece 4 is provided with an adhesive layer in circle. By adopting the waterproof double-sided adhesive tape 6 for connection, the two may be fixedly connected to each other while achieving sealing, thereby ensuring the reliability of the waterproof structure. In order to improve adhesive force of the waterproof double-sided adhesive tape 6, during assembly, one side of the waterproof double-sided adhesive tape 6 is bonded to the rigid supporting piece 4 to form a rigid supporting assembly. Also the waterproof double-sided adhesive tape 6 is activated by the tooling to maintain pressure, and the rigid supporting piece 4 is bonded to the casing 1 in a pressure-maintained state, thereby ensuring the reliability of the connection. If necessary, the rigid supporting piece 4 and the casing 1 are not limited to being bonded by the adhesive layer, and other normal sealing connection methods in the conventional technology may also be adopted for connection.

In addition, the waterproof breathable film 2 and the casing 1, the rigid supporting piece 4 and the casing 1 are bonded by waterproof double-sided adhesive tape 6, which may play a waterproof sealing role and an acoustic sealing role at the same time, so as to optimize the acoustic effect of the acoustic device 7.

In the above embodiments, two opposite ends of the rigid supporting piece 4 are fixedly connected to the casing 1 by dispensing glue. The rigid supporting piece 4 is fixedly connected to the casing 1 by dispensing glue to make the fixation of the rigid supporting piece 4 more reliable. In case that the rigid supporting piece 4 is subjected to a shearing force from other parts, such as a battery bracket assembly, a shearing motion due to force may be avoided, and avoid affecting audio transmission by wrinkles on the waterproof breathable film 2 due to force. During assembly, the rigid supporting piece 4 may be fixed by dispensing glue in a pressure-maintained state to prevent shearing motion due to force and from causing wrinkles on the waterproof breathable film 2.

Further, the rigid supporting piece 4 includes a supporting main body 41 and two wing portions 42 connected to two opposite ends of the supporting main body 41; the two wing portions 42 are fixedly connected to the casing 1, and multiple through holes 43 are provided on the supporting main body 41. That is, the rigid supporting piece 4 includes a supporting main body 41 and two wing portions 42; the supporting main body 41 extrudes the stretchable material piece 3, and the through holes 43 are provided on the supporting main body 41 to facilitate audio transmission. Specifically, multiple through holes 43 are provided on the supporting main body 41. The through holes 43 may be set to micro-holes with small size. The wing portions 42 are wing-shaped elements extending outward and formed on both sides of the supporting main body 41, which are configured to be fixedly connected to the casing 1. Specifically, the wing portions may be connected to the casing 1 by dispensing glue. In case that wing portions 42 are provided on the rigid supporting piece 4, the waterproof double-sided adhesive tape 6 for bonding the rigid supporting piece 4 and the casing 1 respectively includes a main ring and two wing portions connected to both sides of the main ring, so that the periphery of the rigid supporting piece 4 is reliably and fixedly connected to the casing 1.

In order to facilitate the connection between the rigid supporting piece 4 and the casing 1, the casing 1 may be provided with a groove 13 for mounting the rigid supporting piece 4. The shape of the groove 13 is the same as the shape of the rigid supporting piece 4. The mounting groove 12 for mounting the waterproof breathable film 2 and the stretchable material piece 3 is provided at the bottom of the groove 13. That is, the waterproof breathable film 2 and the stretchable material piece 3 form a stepped surface, and the stepped surface may be fixedly connected to the rigid supporting piece 4 through the waterproof double-sided adhesive tape 6.

On the basis of the above embodiments, the acoustic waterproof structure further includes a bracket 5, one side of the bracket 5 is sealed and connected to the rigid supporting piece 4, a cavity 54 for sealing and mounting the acoustic device 7 is provided at the other side of the bracket 5; a bracket sound hole 51 for communicating with the cavity 54 is provided on the bracket 5. That is, with the arrangement of the bracket 5, the acoustic device 7 is sealed and mounted, and the bracket 5 is sealed and connected to one side of the rigid supporting piece 4. That is, the periphery of the bracket sound hole 51 is sealed with the rigid supporting piece 4, thereby achieving acoustic sealing, so as to ensure the audio transmission effect of the acoustic device 7. Of course, the bracket sound hole 51, the through holes 43 on the rigid supporting piece 4, the stretchable material piece sound hole 31 and the casing sound hole 11 should be at least partially opposite to each other, and should all be partially opposite to the sound hole of the acoustic device 7, so audio generated by the acoustic device 7 may be transmitted through a channel composed of the above holes. Preferably, the bracket sound hole 51, the stretchable material piece sound hole 31, and the casing sound hole 11 are provided directly opposite to each other.

Further, the bracket 5 includes a rigid main body 52 and a silicone piece 53 fixedly connected to the rigid main body 52; the silicone piece 53 includes a sealing ring 531 protruding from one side of the rigid main body 52 and a sealing portion 532 located on the other side of the rigid main body 52; the sealing portion 52 forms a cavity 54, and the sealing ring 531 is sealed with the rigid supporting piece 4. Specifically, the bracket 5 may be formed by double-shot injection molding, and the rigid main body 52 may be a plastic piece, which has desirable supporting strength. The bracket sound hole 51 is provided on the plastic piece and the silicone piece. The silicone piece 53 is elastic and forms the sealing ring 531 and the sealing portion 532. The bracket sound hole 51 is located inside the sealing ring 531. The sealing ring 531 protrudes from one side of the plastic piece to be sealed and connected to the rigid supporting piece 4. The sealing portion 532 forms the cavity 54 located on the other side of the plastic piece. The acoustic device 7 is mounted inside the cavity 54. The cavity 54 may cover the acoustic device 7 to achieve the acoustic sealing between the acoustic device 7 and the bracket 5. Since the sealing ring 531 seals between the bracket 5 and the rigid supporting piece 4, the acoustic device 7 and the rigid supporting piece 4 are indirectly sealed and connected through the bracket 5, thereby ensuring the audio transmission effect.

The bracket 5 may be specifically provided at a limiting assembly to cooperate with other parts in the casing 1 for facilitating the installation of corresponding assemblies. For example, in case that a battery assembly 8 is provided in the casing 1, a limiting hole may be provided on the bracket 5 to cooperate with a positioning protrusion on the battery assembly 8 to achieve positioning.

Based on the acoustic waterproof structure provided according to the above embodiments, the present application further provides an electronic device, which includes any acoustic waterproof structure in the above embodiments. Since the electronic device adopts the acoustic waterproof structure in the above embodiments, reference may be made to the above embodiments for the beneficial effects of the electronic device.

Specifically, the electronic device may be a wearable device such as a bracelet and a watch. The electronic device embodied as a bracelet is taken as an example, the casing 1 may be a casing of a main body of the bracelet. The electronic device may also be a mobile terminal such as a mobile phone, a tablet, or other devices with the acoustic device 7, such as a tracker.

The various embodiments are described in a parallel manner or a progressive manner. Each of the embodiments is mainly focused on describing its differences from other embodiments, and reference may be made among these embodiments with respect to the same or similar parts.

It should be further illustrated that a relation term such as “first” and “second” herein is only used to distinguish one entity or operation from another entity or operation, and does not necessarily require or imply that there is an actual relation or sequence between these entities or operations. Furthermore, terms of “include”, “comprise” or any other variants are intended to be non-exclusive. Therefore, a process, method, article, or device including multiple elements includes not only the elements but also other elements that are not enumerated, or also includes the elements inherent for the process, method, article or device. Unless expressively limited otherwise, the statement “comprising (including) a . . . ” does not exclude the case that other similar elements may exist in the process, method, article or device including these elements.

The invention claimed is:

1. An acoustic waterproof structure, comprising a casing, a waterproof breathable film, a stretchable material piece and a rigid supporting piece, wherein a casing sound hole is provided on the casing; wherein one side of the waterproof breathable film is sealed and connected to the casing and covers the casing sound hole, and the other side of the waterproof breathable film abuts against the stretchable material piece; wherein a stretchable material piece sound hole is provided on the stretchable material piece; wherein at least one through hole is provided on the rigid supporting piece, one side of the rigid supporting piece is sealed and connected to the casing and extrudes the stretchable material piece, and the other side of the rigid supporting piece is connected to an acoustic device, wherein a mounting groove is provided on the casing, and the casing sound hole is provided at a bottom of the mounting groove; wherein the waterproof breathable film and the stretchable material piece are all arranged in the mounting groove, and the waterproof breathable film is sealed and connected to the bottom of the mounting groove.

2. The acoustic waterproof structure according to claim 1, wherein the stretchable material piece is made of closed-cell foam.

3. The acoustic waterproof structure according to claim 1, wherein the waterproof breathable film is connected to the casing through a waterproof double-sided adhesive tape.

4. The acoustic waterproof structure according to claim 1, wherein the rigid supporting piece is connected to the casing through a waterproof double-sided adhesive tape.

5. The acoustic waterproof structure according to claim 1, wherein two opposite ends of the rigid supporting piece are fixedly connected to the casing by dispensing glue.

6. The acoustic waterproof structure according to claim 5, wherein the rigid supporting piece comprises a supporting main body and two wing portions respectively connected to two opposite ends of the supporting main body; the two wing portions are fixedly connected to the casing, and a plurality of the through holes are provided on the supporting main body.

7. The acoustic waterproof structure according to claim 1, further comprising a bracket, one side of the bracket is sealed and connected to the rigid supporting piece, a cavity for sealing and mounting the acoustic device is provided at the other side of the bracket; wherein a bracket sound hole for communicating with the cavity is provided on the bracket.

8. The acoustic waterproof structure according to claim 7, wherein the bracket comprises a rigid main body and a silicone piece fixedly connected to the rigid main body; wherein the silicone piece comprises a sealing ring protruding from one side of the rigid main body and a sealing portion located on the other side of the rigid main body; wherein the sealing portion forms the cavity, and the sealing ring is sealed with the rigid supporting piece.

9. An electronic device, comprising an acoustic device and the acoustic waterproof structure according to claim 1.

10. The acoustic waterproof structure according to claim 2, further comprising a bracket, one side of the bracket is sealed and connected to the rigid supporting piece, a cavity for sealing and mounting the acoustic device is provided at the other side of the bracket; wherein a bracket sound hole for communicating with the cavity is provided on the bracket.

11. The acoustic waterproof structure according to claim 3, further comprising a bracket, one side of the bracket is sealed and connected to the rigid supporting piece, a cavity for sealing and mounting the acoustic device is provided at the other side of the bracket; wherein a bracket sound hole for communicating with the cavity is provided on the bracket.

12. The acoustic waterproof structure according to claim 4, further comprising a bracket, one side of the bracket is sealed and connected to the rigid supporting piece, a cavity for sealing and mounting the acoustic device is provided at the other side of the bracket; wherein a bracket sound hole for communicating with the cavity is provided on the bracket.

13. The acoustic waterproof structure according to claim 5, further comprising a bracket, one side of the bracket is sealed and connected to the rigid supporting piece, a cavity for sealing and mounting the acoustic device is provided at the other side of the bracket; wherein a bracket sound hole for communicating with the cavity is provided on the bracket.

14. The acoustic waterproof structure according to claim 6, further comprising a bracket, one side of the bracket is sealed and connected to the rigid supporting piece, a cavity for sealing and mounting the acoustic device is provided at the other side of the bracket; wherein a bracket sound hole for communicating with the cavity is provided on the bracket.

* * * * *